(12) United States Patent
Choi

(10) Patent No.: US 11,472,063 B2
(45) Date of Patent: Oct. 18, 2022

(54) WIRE SAW EXCAVATION APPARATUS CAPABLE OF CHANGING CUTTING LINE IN ACCORDANCE WITH CUTTING SECTION AND TUNNEL EXCAVATION METHOD USING SAME

(71) Applicant: In Hwan Choi, Concord (CA)

(72) Inventor: In Hwan Choi, Concord (CA)

( * ) Notice: Subject to any disclaimer, the term of this patent is extended or adjusted under 35 U.S.C. 154(b) by 0 days.

(21) Appl. No.: 17/381,099

(22) Filed: Jul. 20, 2021

(65) Prior Publication Data
US 2021/0348510 A1    Nov. 11, 2021

Related U.S. Application Data

(63) Continuation-in-part of application No. PCT/CA2020/050048, filed on Jan. 17, 2020.

(30) Foreign Application Priority Data

Jan. 23, 2019 (KR) .................. 10-2019-0008550

(51) Int. Cl.
| | |
|---|---|
| *B28D 1/08* | (2006.01) |
| *B28D 1/12* | (2006.01) |
| *E21C 25/56* | (2006.01) |
| *B23D 57/00* | (2006.01) |
| *E21D 9/10* | (2006.01) |

(52) U.S. Cl.
CPC ............ *B28D 1/088* (2013.01); *B28D 1/124* (2013.01); *B23D 57/0023* (2013.01); *E21C 25/56* (2013.01); *E21D 9/1053* (2013.01); *E21D 9/1086* (2013.01); *E21D 9/1093* (2013.01)

(58) Field of Classification Search
CPC ......... E21D 9/03; E21D 9/1053; E21C 25/54; E21C 25/56; B28D 1/08; B28D 1/088; B28D 1/124
USPC ...................................................... 299/15, 35
See application file for complete search history.

(56) References Cited

U.S. PATENT DOCUMENTS

| | | | | |
|---|---|---|---|---|
| 4,821,703 A | * | 4/1989 | Kubo ................. | B23D 57/0061 125/1 |
| 4,832,411 A | * | 5/1989 | Johnston ............ | B23D 57/0053 125/21 |
| 4,950,034 A | * | 8/1990 | Reid .................. | B23D 57/0007 299/15 |

FOREIGN PATENT DOCUMENTS

| | | | | |
|---|---|---|---|---|
| CN | 104763483 A | | 7/2015 | |
| CN | 205422729 U | | 8/2016 | |
| CN | 109519190 A | | 3/2019 | |
| ES | 2284363 A1 | * | 11/2007 | |
| JP | H0470309 A | * | 3/1992 | |
| JP | 07269266 A | * | 10/1995 | ............ B28D 1/088 |
| KR | 20180101849 A | * | 9/2018 | |

\* cited by examiner

*Primary Examiner* — Abby J Flynn
*Assistant Examiner* — Michael A Goodwin
(74) *Attorney, Agent, or Firm* — Patent Office of Dr. Chung Park

(57) ABSTRACT

The present invention relates to a wire saw excavation apparatus that is installed on a plurality of entry holes, where the plurality of entry holes are drilled according to a cutting section of a target surface of rock to be excavated so that the target surface is excavated by using wire saws. The wire saw excavation apparatus mounts N number of pulleys on one entry arm to cut the rock in N number of directions all at once.

2 Claims, 18 Drawing Sheets

WIRE SAW EXCAVATION APPARATUS CAPABLE OF CHANGING CUTTING LINE IN ACCORDANCE WITH CUTTING SECTION AND TUNNEL EXCAVATION METHOD USING SAME

CROSS-REFERENCE TO PRIOR APPLICATIONS

This application is a continuation-in-part application of PCT International Patent Application No. PCT/CA2020/050048, filed on Jan. 17, 2020 under 35 U.S.C. § 371, which claims priority of Korean Patent Application No. 10-2019-0008550, filed on Jan. 23, 2019, which are all hereby incorporated by reference in their entirety.

BACKGROUND OF THE INVENTION

The present invention relates to a wire saw excavation apparatus that is capable of changing cutting lines according to cutting sections and a tunnel excavation method using the same, thereby improving an excavation speed and collecting the types of stone available.

BACKGROUND OF THE RELATED ART

On a location where rock is buried in construction of a tunnel by drilling the ground, the tunnel is excavated using a blasting method or tunnel boring machine (TBM).

In the case of the blasting method, the rock to be excavated is cut along a cutting baseline by means of a wire saw or jet burner, and next, bores for blasting the rock are formed. After that, explosives are charged to blast the rock, and the rock is excavated within a given range thereof. In the case of the blasting method, however, it takes a lot of works and time to blast the rock stably and to a desired shape. In addition, explosions of explosives often make the rock excavated up to an unexpected range and cause pollution problems such as noise and dust scattering generated from blasting.

The TBM is a rotary excavator which rotates a cutter head equipped with lots of disc cutters to break and excavate rock. Excavation using the TBM has advantages of faster construction speed, more improved safety, and lower degree of pollution than the blasting method. However, the TBM is the very expensive equipment and is difficult in use for small/medium sized tunnel excavation works. Since the rock collected through the excavation is crushed to the size of gravel, further, target rock cannot be recycled.

For solving such problems, the technology of cutting and excavating rock using a wire saw is disclosed in Korean Patent Registration No. 10-1649328 (Prior art document 1).

In order to excavate a tunnel using a wire saw, the target surface to be excavated should be segmented and entry holes shall be drilled around the edges of the segmented area. After that, the arms each having a wire saw are inserted into two adjacent entry holes to each other, and next, the wire saw excavation apparatus operates to cut one segment of the segmented area.

For example, if the segmented area is a rectangle, the wire saw excavation apparatus as disclosed in the prior art document 1 cuts the rectangle four times because the rectangle has four sides, and next, the wire saw excavation apparatus cuts the end of the inside of the rectangle cut. In order to construct a tunnel, however, there are a large number of segmented areas, and accordingly, the working hours for arm installation, cutting, and arm removal would be inevitably increased geometrically.

Moreover, another excavation apparatus using a wire saw is disclosed in Japanese Patent Publication No. 07-269266 (Prior art document 2).

In the case where a tunnel is excavated using a wire saw, a target surface is not always constant, and in some cases, there is a need to change cutting sections.

However, the wire saw excavation apparatus proposed in the prior art document 2 has four entry arms fixed to each other through fixed members so that there is a limitation in changing the locations of the entry arms and the number of the entry arms according to cutting sections. In the case of using the wire saw excavation apparatus proposed in the prior art document 2, the entry holes may be drilled on even locations where they are not needed, thereby undesirably lowering the work efficiency.

Therefore, there is a need for a new method available in the field.

SUMMARY OF THE INVENTION

Accordingly, the present invention has been made in view of the above-mentioned problems occurring in the related art, and it is an object of the present invention to provide a wire saw excavation apparatus and a tunnel excavation method using the same that can excavate a target surface with minimum time consumption.

On the other hand, other objects not specified in the present invention will be further considered within the scope that can be easily inferred from the following detailed descriptions and effectiveness.

To accomplish the above-mentioned objects, according to one aspect of the present invention, there is provided a wire saw excavation method including the steps of: drilling a plurality of entry holes selectively on the edge lines and the crossing points of lattice type cutting lines of a target surface of rock to be excavated and inserting a plurality of entry arms into the plurality of entry holes, each entry arm having multi-directional pulleys on which wire saws are wired according to directions thereof so as to segmentedly cut the entire section of the rock to be excavated to removable sizes all at once through the wire saws; collecting to a driving roller the wire saws that are located in horizontal, vertical, and diagonal directions in such a manner as to rotate in different directions from one another to perform the cutting operations for cutting sections; and operating the driving roller with a support force generated from a support frame supporting the entry arms inserted into the entry holes to segmentedly cut the edge lines and the lattice type cutting sections of the target surface to the removable sizes all at once.

To accomplish the above-mentioned objects, according to another aspect of the present invention, there is provided a wire saw excavation apparatus for segmentedly cutting the entire section of rock to be excavated all at once, the apparatus including: two or more multi-directional entry arm pulleys inserted into entry holes drilled on the crossing points of the cutting lines of the entire section of the rock to be excavated in such a manner as to be mounted selectively on the end portions of entry arms in any one direction of horizontal, vertical, and diagonal directions, the number of pulleys inserted into each entry hole being changed according to the number of crossing cutting lines and cutting environments; and wire saws wired by direction onto the multi-directional entry arm pulleys inserted into the corresponding entry hole in such a manner as to connectedly operate with the wire saws wired onto the adjacent entry hole in the same directions, wherein the multi-directional entry arm pulleys inserted into each entry hole rotate in the different directions from one another, and even if the wire saws wired into the entry hole in the horizontal, vertical, and diagonal directions rotate in a relatively small space, the wire saws cut the entire section along the edge lines of the entire section and the lattice type cutting lines inside the entire section according to the directions all at once, without having any interference with one another.

BRIEF DESCRIPTION OF THE DRAWINGS

The above and other objects, features and advantages of the present invention will be apparent from the following detailed description of the embodiments of the invention in conjunction with the accompanying drawings, in which.

DETAILED DESCRIPTION OF THE EMBODIMENTS

In describing the present invention, if it is determined that the detailed explanation on the well known technology related to the present invention makes the scope of the present invention not clear, the explanation will be avoided for the brevity of the description.

Figure 1:
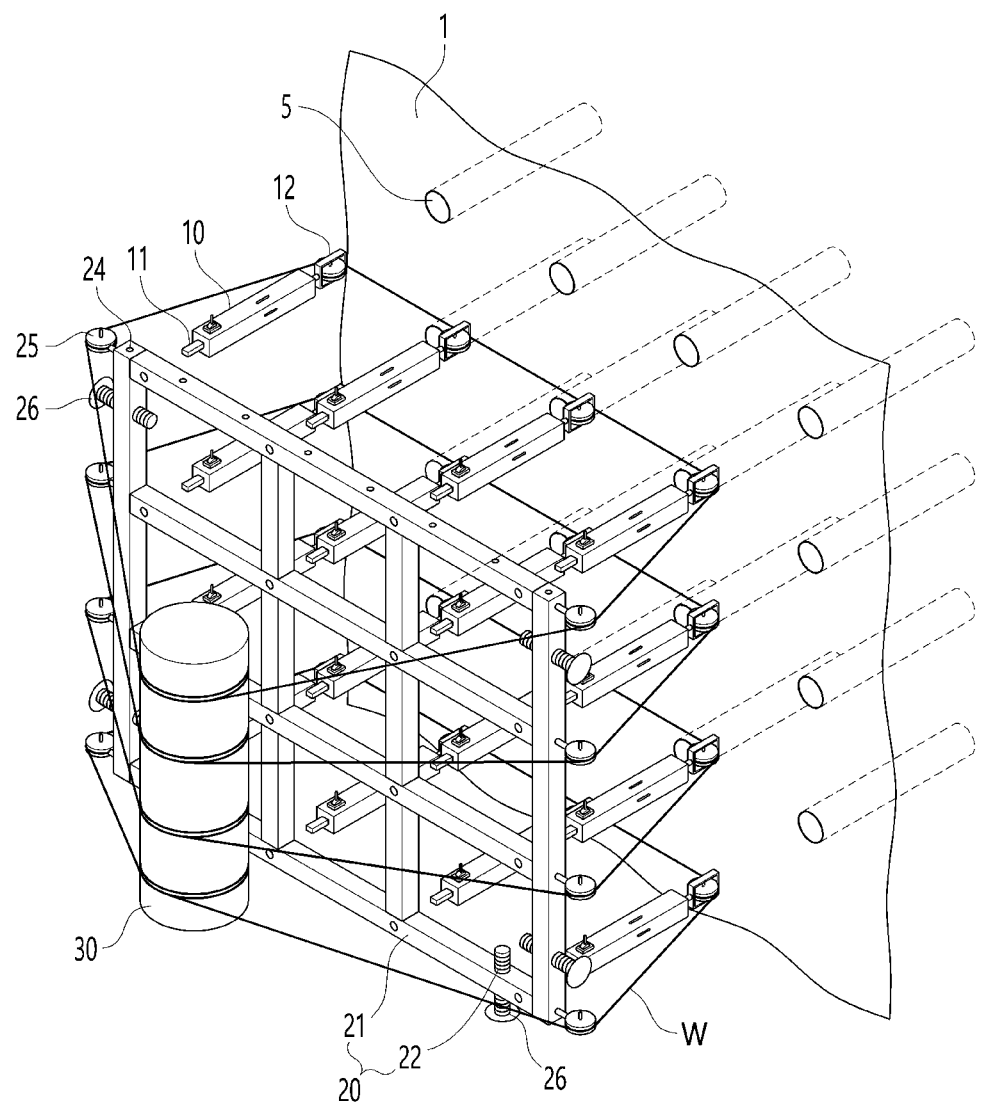
FIG. 1 is a schematic perspective view showing a wire saw excavation apparatus according to the present invention.
Figure 2:
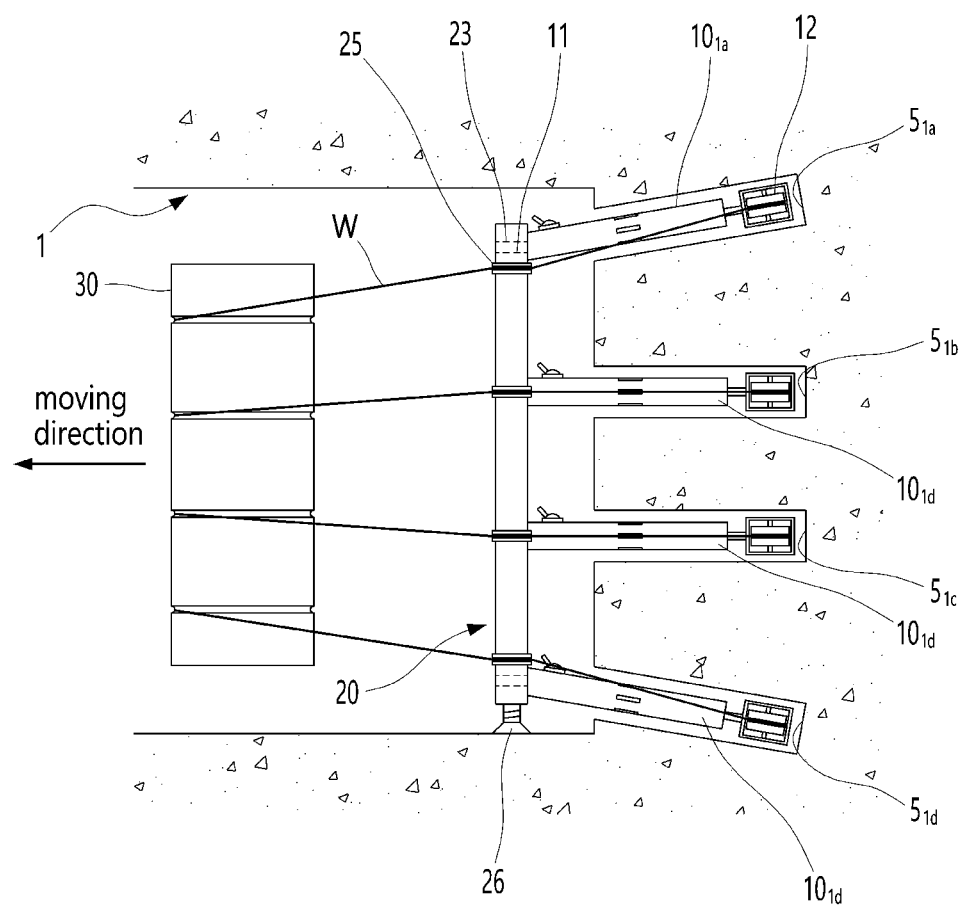
FIG. 2 is a schematic sectional view showing the wire saw excavation apparatus according to the present invention.
Figure 3:
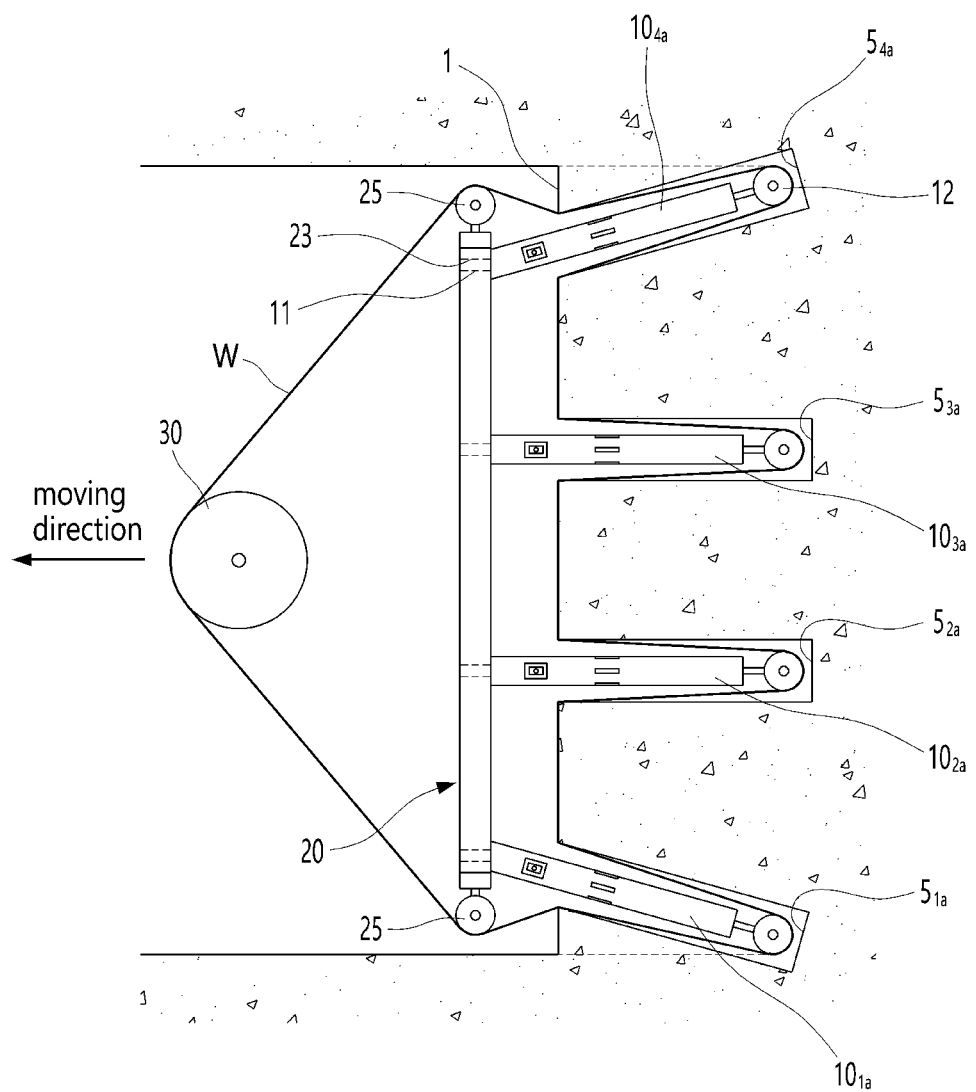
FIG. 3 is a schematic plan view showing the wire saw excavation apparatus according to the present invention.

FIG. 1 is a schematic perspective view showing a wire saw excavation apparatus according to the present invention, FIG. 2 is a schematic sectional view showing the wire saw excavation apparatus according to the present invention, and FIG. 3 is a schematic plan view showing the wire saw excavation apparatus according to the present invention.

Referring to FIGS. 1 to 3, the parts of a wire saw excavation apparatus according to the present invention will be described.

The wire saw excavation apparatus according to the present invention is installed in a plurality of entry holes 5 drilled according to the cutting sections of a target surface 1 on rock to be excavated and excavates the target surface 1 using wire saws W. For this, the wire saw excavation apparatus according to the present invention includes entry arms 10, a support frame 20, and a driving roller 30. On the other hand, the cutting sections may be composed of horizontal lines, vertical lines or diagonal lines.

Before installing the wire saw excavation apparatus according to the present invention, a plurality of entry holes 5 on the target surface 1 is drilled according to the cutting sections. The cutting sections refer to sections composed of cutting lines to be cut in order to excavate rock. That is, by cutting the rock to a predetermined depth according to the cutting lines of the cutting sections and cutting the end of the rock located at the predetermined depth, it is possible to take out the cut stone according to the cutting sections using equipment. By repeating this work, a tunnel can be excavated and the stone available may be obtained at the same time.

Each entry hole 5 is formed at the point where one cutting line and the other cutting line of each cutting section meet. The entry hole 5 is drilled using a jumbo drill, but is not limited thereto. The entry arm 10 where the wire saw is wired is inserted into the entry hole 5. Each entry arm 10 is formed long in one direction in such a manner as to be inserted into the entry hole 5, and the cross section of each entry arm 10 may be rectangular or circular, but is not limited thereto. That is, the cross section of the entry arm 10 may be polygonal.

When circulatedly driving and pulling the wire saw wired, as shown in FIG. 3, from the target surface, the rock is cut along the cutting lines. In specific, the wire saw excavation apparatus according to the present invention has the advantage that the cutting operation can be performed for the plurality of cutting sections all at once.

At the end of each entry arm 10 in the insertion direction thereof, a pulley 12 to which the wire saw is fitted is located to help the fitted wire saw circulatedly driven. The pulley 12 is extended from the end of the entry arm 10, as shown in the drawings, but is not limited thereto. For example, the pulley 12 may be installed inside the end of the entry arm 10 or on one side of the end.

Further, an insertion member 11 is located on the end portion of the entry arm 10 in the opposite direction to the insertion direction thereof. The insertion member 11 has a cross sectional area smaller than the entry arm 10. Through the difference between the cross sectional areas of the insertion member 11 and the entry arm 10, a locking projection is formed therebetween. Accordingly, the support frame 20 has insertion holes 23 formed thereon in such a manner as to insert the insertion members 11 thereinto, and through the locking projections, in this case, the entry arms 10 are supported against the support frame 20. Each insertion member 11 may be freely shaped, but so as to prevent its rotation, desirably, the insertion member 11 has a cross section of a polygon.

Figure 4:
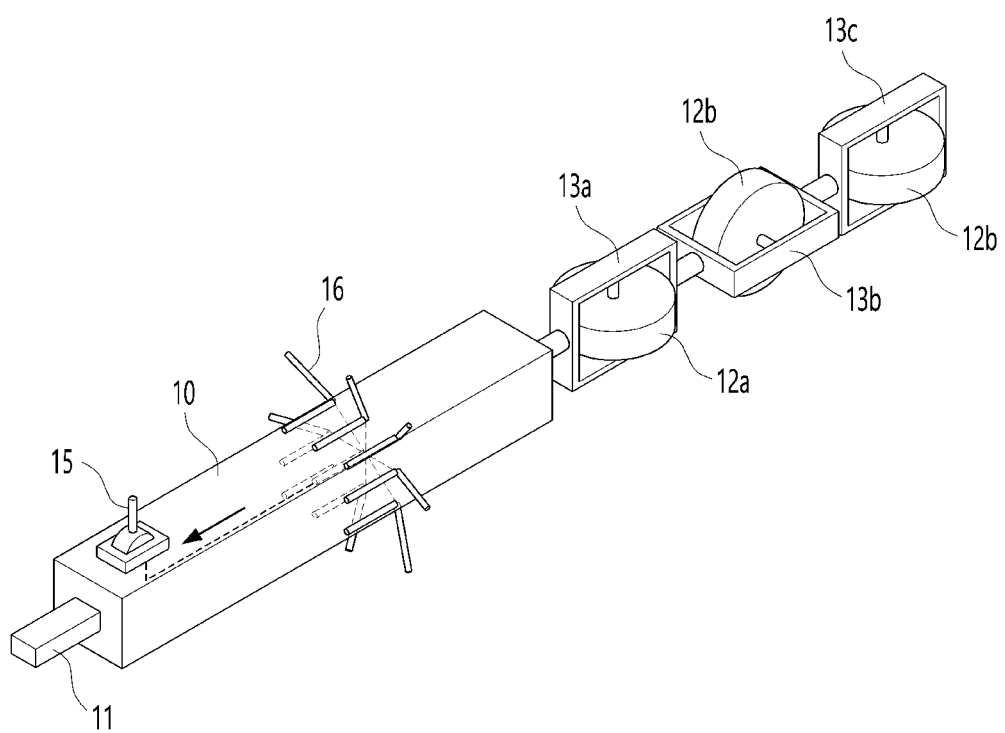
FIG. 4 is a schematic perspective view showing another example of the entry arm.

FIG. 4 is a schematic perspective view showing another example of the entry arm 10. Referring to FIG. 4, a plurality of fixing wedges 16 operating by a lever 15 may be installed at the entry arm 10. After the entry arm 10 is inserted into the entry hole 5, it is possible to fix the entry arm 10 to the entry hole 5 since the fixing wedges 16 are developed to the wall of the entry hole 5 by operating the lever 15. It is also possible for a plurality of pulleys 12a, 12c and 12d to be placed in one entry arm 10. Each pulley 12a, 12b, and 12c has a cover 13a, 13b, and 13c. As such, placement of the plurality of pulleys 12a, 12b and 12c in one entry arm 10 is to perform the cutting operations for a plurality of cutting sections all at once using the wire saw excavation apparatus according to the present invention. For example, the entry holes 5 to which a plurality of cutting lines is provided are defined as even entry holes, and the entry holes 5 to which an odd number of cutting lines are provided are defined as odd entry holes. If zero or two odd entry holes exist(s) on the cutting sections, all cutting sections can be cut at once through the wire saw excavation apparatus according to the present invention. So as to cut all cutting sections at once, however, there is a need to locate the plurality of pulleys 12a, 12b and 12c on one entry arm 10, In the case where the wire saw passes through one entry hole 5 several times so as to minimize the number of processes, the number of pulleys 12a, 12b and 12c corresponding to the number of the several times or the larger number of pulleys than the pulleys 12a, 12b and 12c may be located on one entry arm 10 inserted into the corresponding entry hole 5.

As mentioned above, the wire saw excavation apparatus according to the present invention can perform the cutting operations for the plurality of cutting sections all at once, and to do this, the plurality of entry arms 10 is used all at once. For example, three or more entry arms 10 are used all at once, and desirably, it is possible that five or more entry arms 10 are used all at once.

In addition, the target surface 1 of the rock to be excavated varies every place where excavation is performed and the cutting sections also vary each time. If the cutting sections are changed, the number of entry holes 5 changes. The wire saw excavation apparatus according to the present invention can actively respond to such environmental changes. That is, the use of the wire saw excavation apparatus according to the present invention has the advantage that the number of entry arms installed on the support frame can be changed depending on the cutting sections.

Like this, the wire saw excavation apparatus according to the present invention makes use of the support frame 20 so as to use the plurality of entry arms 10 all at once or to respond to different environments. In the case of soft rock, the time required for installation of entry holes may be reduced by reducing the number of entry holes. On the contrary, in the case of hard rock, the time required for cutting may be reduced by increasing the number of entry holes. In addition, it is possible to adjust the shape of the stone produced during the excavation of the tunnel, which can significantly increase the availability of the stone produced.

The support frame 20 includes first frames 21 placed in a first direction and second frames 22 placed in a second direction. For example, as shown in FIG. 1, the first frames 21 may refer to frames placed in a horizontal direction and the second frames 22 may refer to the frames placed in a vertical direction.

The support frame 20 may have a matrix structure in which the first frames 21 and the second frames cross one another to correspond to the cutting sections.

On the support frame 20, insertion holes 23 are formed at positions corresponding to the entry holes 5 of the cutting sections. The insertion holes 23 are formed on the first frames 21 or the second frames 22, but are not limited thereto. For example, the insertion holes 23 may be formed by combining separate insertion members to the first frames 21 or the second frames 22.

The support frame 20 has expansion holes 24. At the expansion holes 24, conversion rollers 25 are disposed to adjust directions so that the wire saws W do not damage the support frame 20, and one or more support rods 26 protruding outward therefrom are disposed to fix the support frame 20 to the wall.

Figure 6:
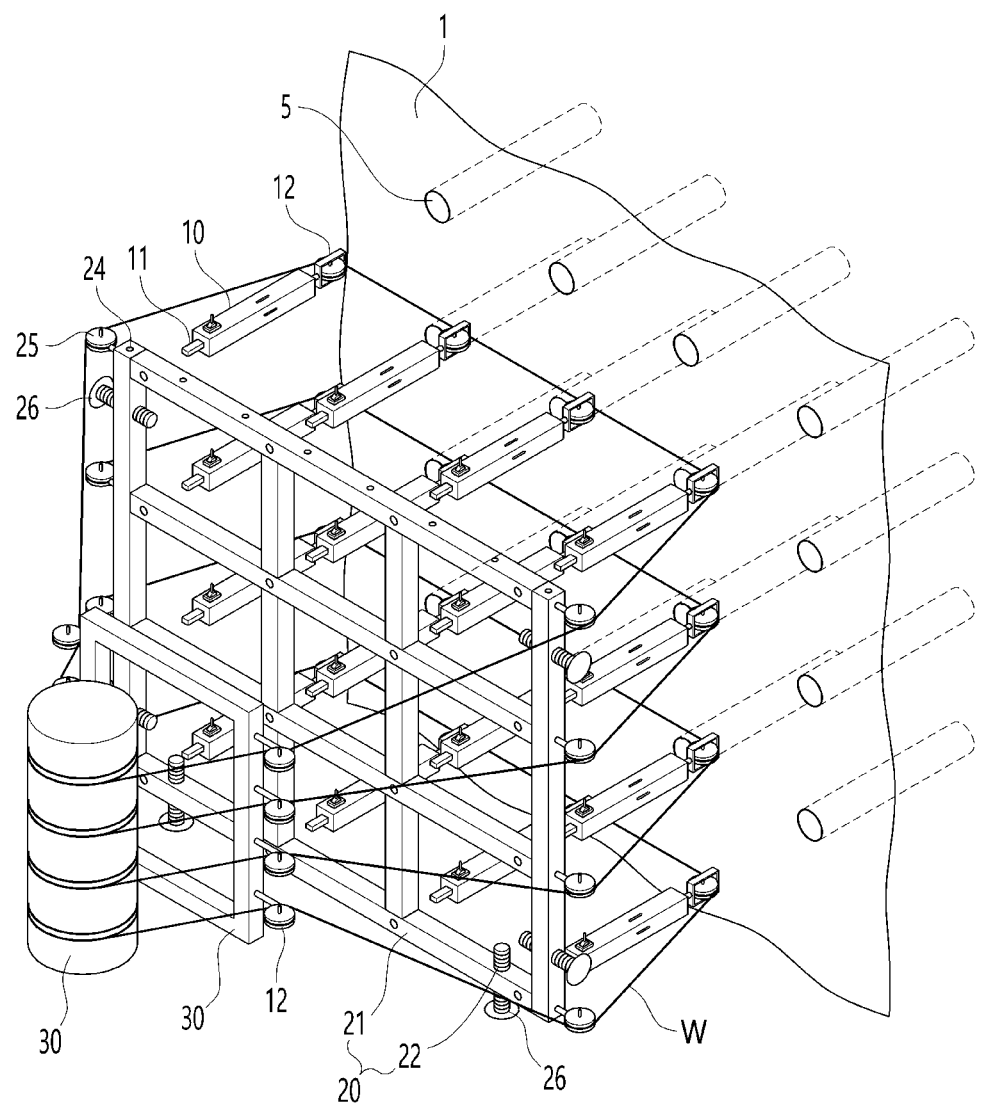
FIG. 6 is a schematic plan view showing an example where the wire saw excavation apparatus according to the present invention further includes an auxiliary support frame.

On the other hand, as shown in FIG. 6, the wire saw excavation apparatus according to the present invention further includes a wire saw guide frame 40 located between the support frame 20 and the driving roller 30. The wire saw guide frame 40 has a similar height to the driving roller 30 and is provided with an intermediate pulley 45 adapted to allow the wire saws W wired on the driving roller 30 to be drawn in parallel with the driving roller 30. So as to minimize the escape of the wire saws W from the driving roller 30 or to utilize the force applied from the driving roller 30 in cutting, without any loss, the wire saws W have to be drawn from the driving roller 30 in parallel with the rotating direction of the driving roller 30. Accordingly, the wire saw excavation apparatus according to the present invention is configured to allow the wire saws W wired on the driving roller 30 to be drawn in parallel with the driving roller 30 through the wire saw guide frame 40.

Figure 5:
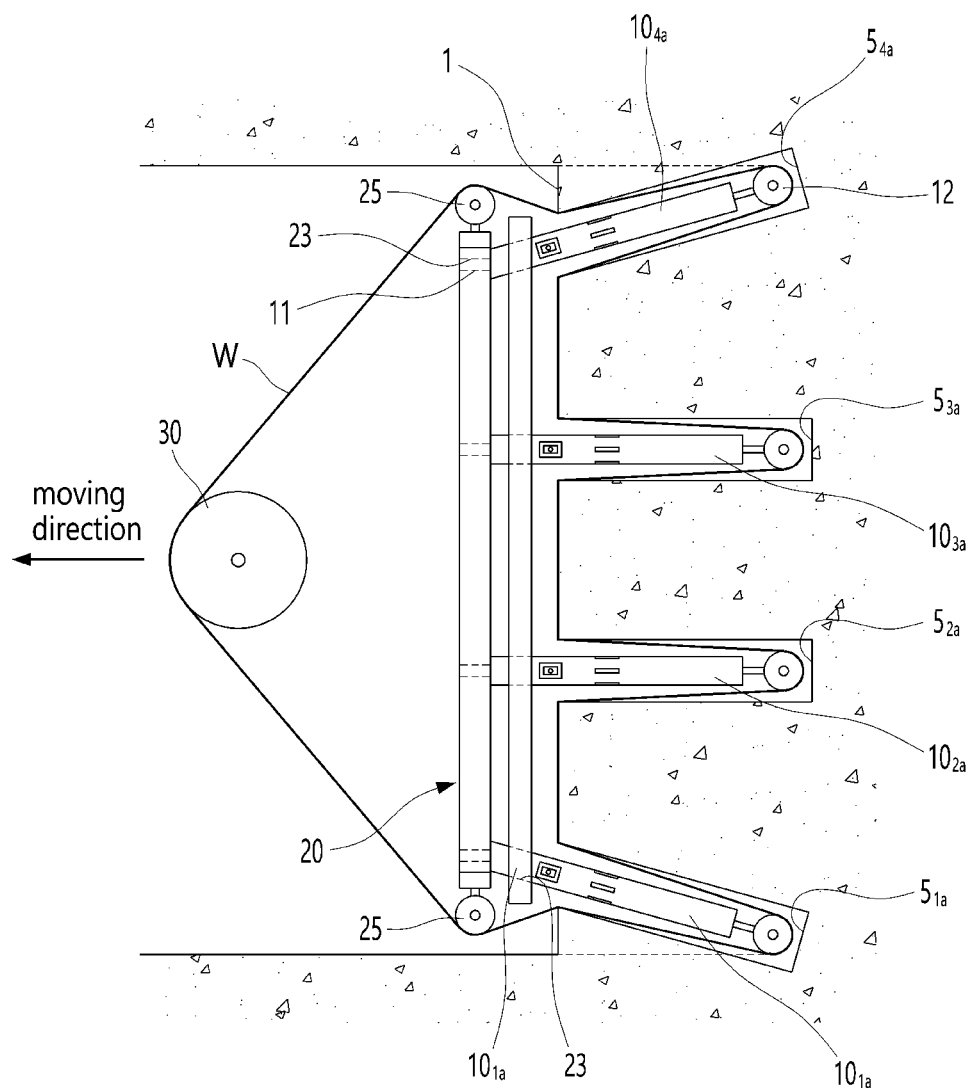
FIG. 5 is a schematic perspective view showing an example where the wire saw excavation apparatus according to the present invention further includes a wire saw guide frame.

Further, as shown in FIG. 5, the wire saw excavation apparatus according to the present invention further includes an auxiliary support frame 20' located between the support frame 20 and the target surface 1. The auxiliary support frame 20' may have the same components as the support frame 20, but is different from the support frame 20 in that instead of the insertion holes 23, auxiliary support holes 23' are formed. The auxiliary support holes 23' are holes having the same cross sections and shapes as the entry arms 10 so as to insert the entry arms 10 thereinto. In the case where the auxiliary support frame 20' are provided, the entry arms 10 are supported on the back sides thereof against the support frame 20 and thus fixed in every direction by means of the auxiliary support frame 20'.

The wire saws 'A' are wired endlessly along the entry arms 10. The wire saws W are circulated by the driving roller 30. As the driving roller 30 rotates, the wire saws 'A' are circulated to cut the rock according to the cutting lines. Furthermore, the driving roller 30 is gradually moved in the opposite direction to the insertion direction thereof, and accordingly, the tension of the wire saws W is maintained depending on the movement of the driving roller 30 to cut the rock continuously.

Figure 7A:
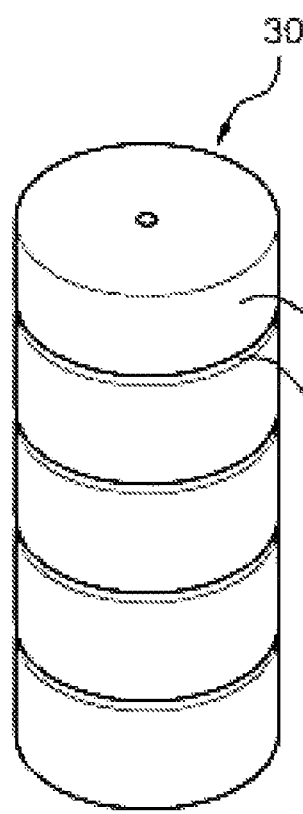
FIGS. 7A and 7B are schematic perspective views showing a driving roller.
Figure 7B:
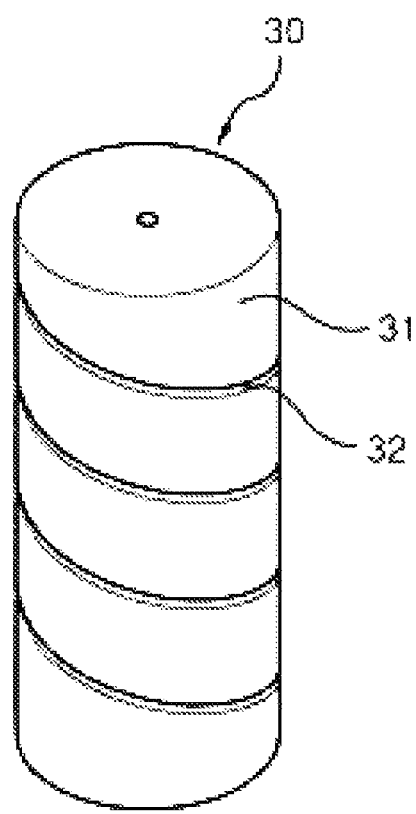

As shown in FIGS. 7A and 7B, the driving roller 30 may include a cylindrical body 31 extended in one direction and grooves 32 formed on the body 31.

The number of grooves 32 is equal to or greater than the number of wire saws W. In the case where first to n-th wire saws (n is a natural number) are used, as shown in FIG. 7A, first to n-th grooves 32 are formed on the driving roller 30. For example, if the driving roller 30 has a shape of a cylinder extended vertically, the plurality of wire saws W is spaced apart from each other on the driving roller 30 to cut the rock vertically.

On the contrary, if only one wire saw W is used, as shown in FIG. 7B, the driving roller 30 on which a spiral groove 32 is formed is used.

On the other hand, as shown in FIGS. 2 to 4, the entry arms 10 placed on the outsides of all cutting sections among the entry arms 10 may be installed in such a manner as to be open toward the outsides of the cutting sections. When the rock of the target surface 1 is excavated using the wire saw excavation apparatus according to the present invention, the excavation operation must be continued by reinstalling the wire saw cutting apparatus for a newly exposed target surface. In this case, if the entry arms 10 placed on the outsides of all cutting sections among the entry arms 10 are not open toward the outsides of the cutting sections, the newly exposed target surface may have a smaller area than the existing target surface 1. However, as shown in FIGS. 2 to 4, if the entry arms 10 placed on the outsides of all cutting sections among the entry arms 10 are open toward the outsides of the cutting sections, the space for reinstalling the wire saw excavation apparatus can be ensured. This can significantly improve the efficiency of the excavation work.

Hereinafter, the method for excavating a tunnel using the wire saw excavation apparatus according to the present invention will be described.

Figure 8:
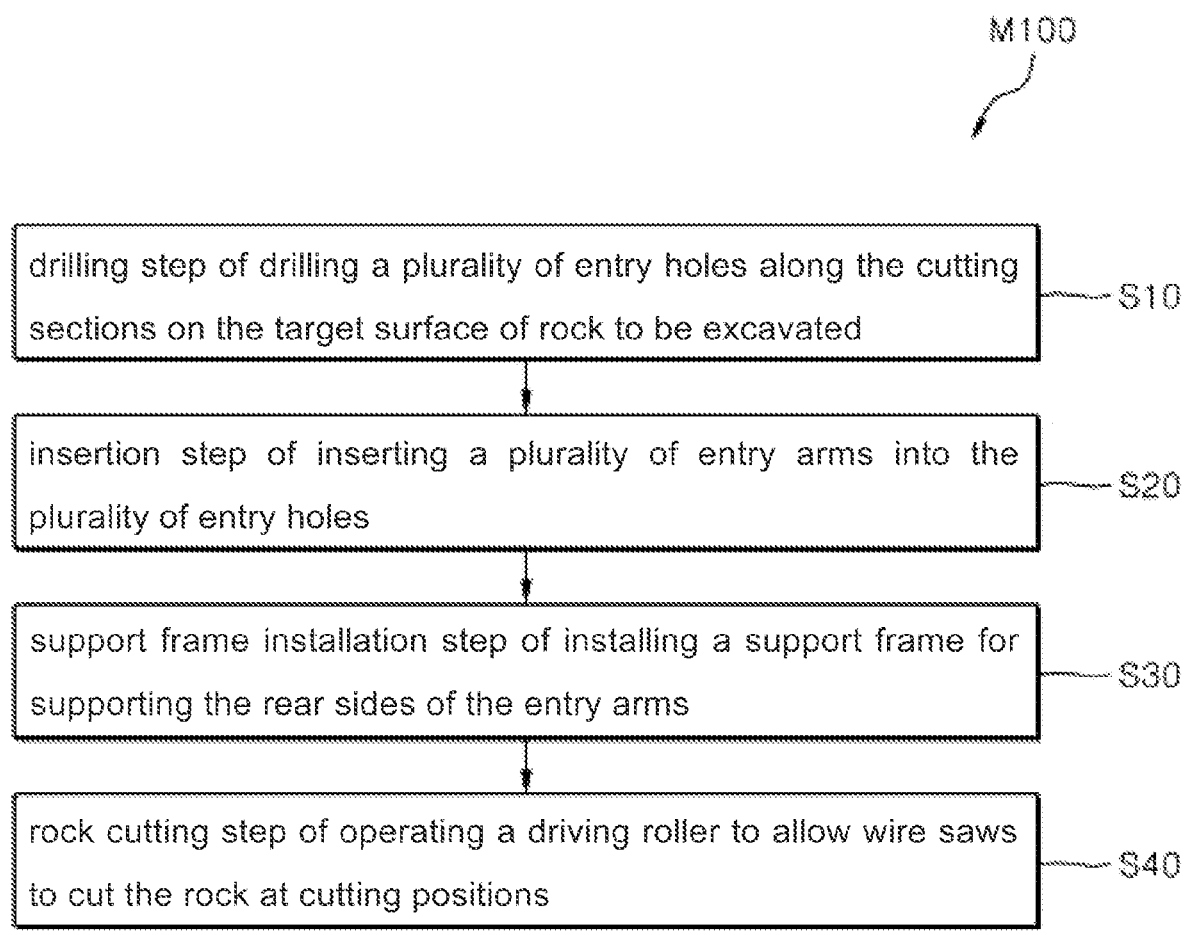
FIG. 8 is a schematic flowchart showing a tunnel excavation method using a wire saw excavation apparatus according to the present invention.

FIG. 8 is a schematic flowchart of a tunnel excavation method M100 using a wire saw excavation apparatus according to the present invention.

Referring to FIG. 8, the tunnel excavation method M100 using a wire saw excavation apparatus according to the present invention includes a drilling step S10 of drilling a plurality of entry holes along the cutting sections on the target surface of rock to be excavated, an insertion step S20 of inserting a plurality of entry arms on which wire saws are wired to correspond to cutting lines of the cutting sections and having insertion members located on the end portions in the opposite direction to the insertion direction thereof in such a manner as to have cross sectional areas smaller than the entry arms, a support frame installation step S30 of preparing a support frame having a matrix structure corresponding to the cutting sections by crossing first frames placed in a first direction and second frames placed in a second direction and insertion holes adapted to insert the insertion members thereinto and installing the support frame in such a manner as to allow the insertion members to be inserted into the insertion holes, and a rock cutting step S40 of operating a driving roller where portions of the wire saws are lockedly wound to allow the wire saws to cut the rock at cutting positions.

First, the drilling step S10 is performed. The drilling step S10 is to set the cutting sections on the target surface of the rock to be excavated and to drill the entry holes using the jumbo drill at the points where the cutting lines constituting the cutting sections cross over.

Next, the insertion step S20 is performed to thus insert the entry arms on which the wire saws are wired into the plurality of entry holes to allow the entry arms to correspond to the cutting lines to be cut. In this case, if each entry arm is provided with fixing wedges, the entry arm may be fixed to the corresponding entry hole by operating a lever.

The support frame installation step S30 installs the support frame which has the matrix structure corresponding to the cutting sections by crossing the first frames placed in the first direction and the second frames placed in the second direction and is provided with the insertion holes adapted to insert the insertion members thereinto. On the other hand, before performing the support frame installation step S30, an auxiliary support frame installation step may be performed to install an auxiliary support frame which has a matrix structure corresponding to the cutting sections by crossing first frames placed in the first direction and second frames placed in the second direction and is provided with auxiliary support holes adapted to insert the entry arms thereinto.

The insertion step S20 and the support frame installation step S30 may be changed in order. For example, after the entry arms are inserted into the entry holes, the support frame is located to allow the insertion holes to correspond to the insertion members, and otherwise, after the insertion members of the entry arms are fastened to the insertion holes of the support frame, the support frame and the entry arms move together so that the entry arms are inserted into the entry holes.

Like this, when the entry arms are inserted into the entry holes, the wire saws wired endlessly are placed in a '⊂'-like shape by adjacent entry arms and the rock between them. In other words, the rock is located at the center of the '⊂'-like shape.

Next, the rock cutting step S40 is performed to operate the driving roller here portions of the wire saws are lockedly wound to allow the wire saws to cut the rock at cutting positions. The driving roller gradually moves to the direction opposite to the target surface while it rotates. Accordingly, the wire saws wired initially in the '⊂'-like shape are gradually open to cut the rock.

Now, various methods for excavating a tunnel using the wire saw excavation apparatus according to the present invention will be explained.

Figure 9:
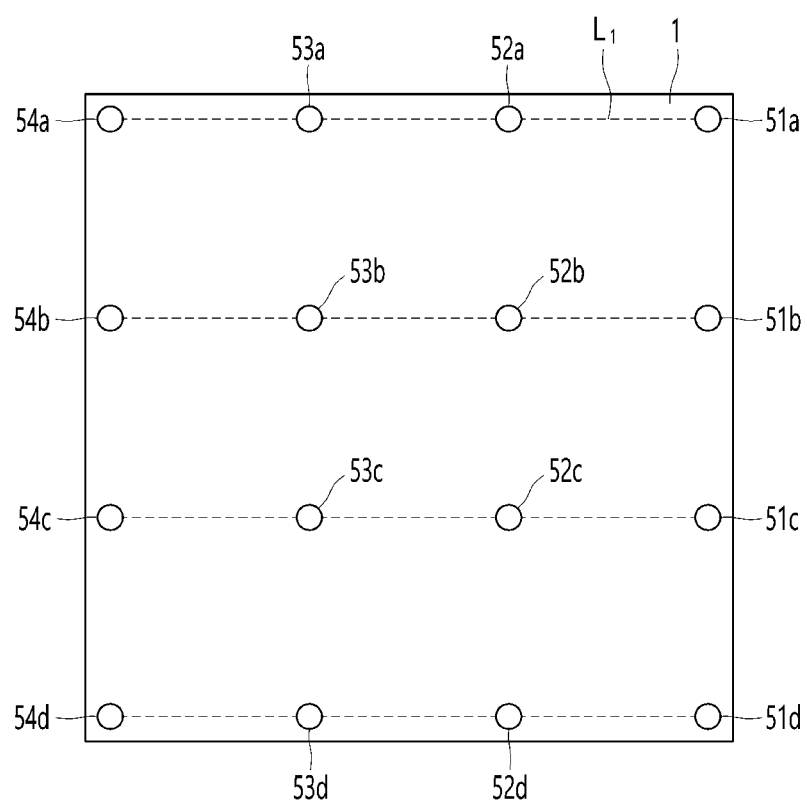
FIG. 9 is a front view showing first cutting lines of a target surface to be excavated according to cutting sections.
Figure 10:
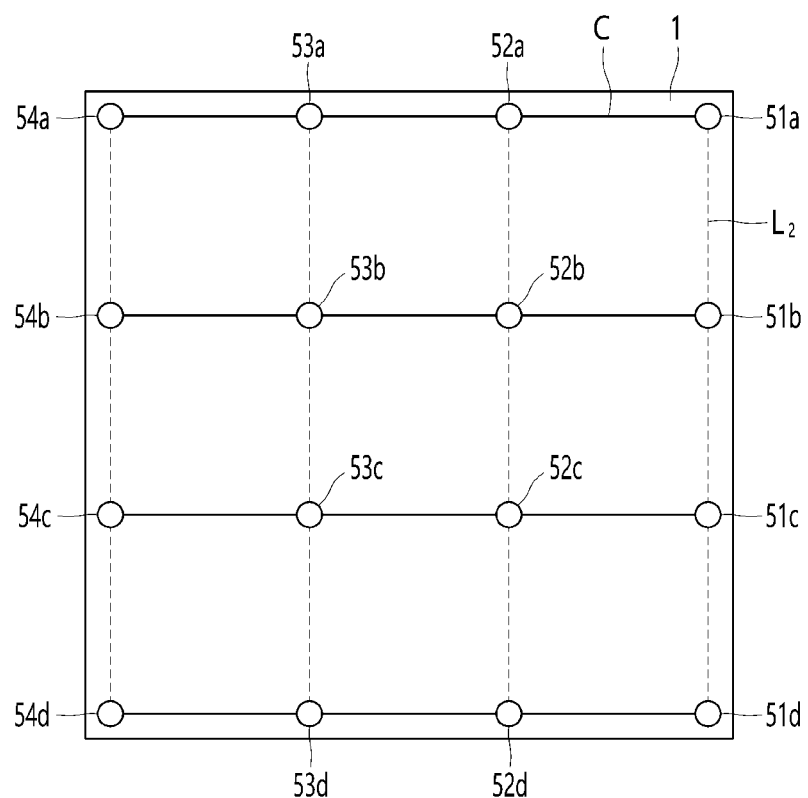
FIG. 10 is a front view showing second cutting lines to be cut after the first cutting lines are cut through the wire saw excavation apparatus.

Referring to FIGS. 9 and 10, a plurality of entry holes 51a to 51d, 52a to 52d, 53a to 53d, and 54a to 54d is first drilled on a target surface 1.

Next, as shown in FIG. 9, the steps S20 to S40 are performed to allow the wire saws to be located correspondingly to horizontal cutting lines $L_1$.

After that, as shown in FIG. 10, the steps S20 to S40 are performed to allow the wire saws to be located correspondingly to vertical cutting lines $L_2$.

Lastly, the end portion inside the rock cut along the cutting sections through the wire saws is cut to remove the rock, and accordingly, the excavation is completed. If the rock in the cut state is removed, it can be used as stone.

Figure 11:
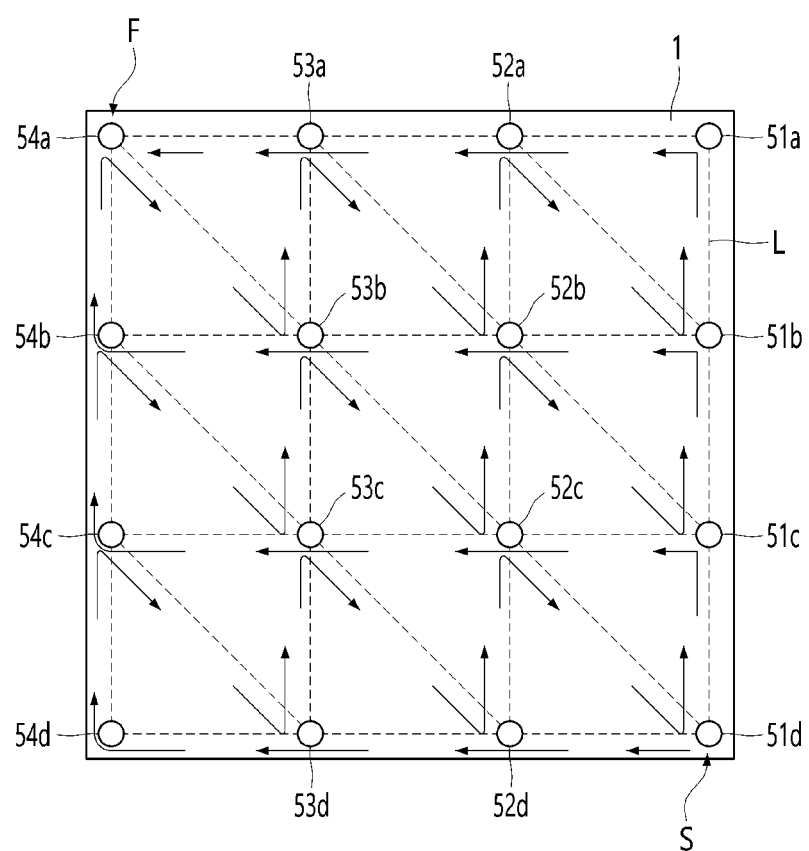
FIG. 11 is a front view showing examples of the cutting lines for cutting the cutting sections of the target surface all at once.

On the other hand, as shown in FIG. 11, it is also possible to cut the rock according to the cutting sections all at once.

The entry holes 5 to which a plurality of cutting lines is provided are defined as even entry holes, and the entry holes 5 to which an odd number of cutting lines are provided are defined as odd entry holes. If zero or two odd entry holes exist(s) on the cutting sections, the rock can be cut according to the cutting sections all at once.

For example, if the wire saw is wired from a point S in FIG. 11 to a point F along arrows, wiring for all cutting lines L is possible. In this case, the wire saws pass through some entry holes several times, and to do this, accordingly, the entry arms may have a plurality of pulleys installed on the ends.

Figure 12:
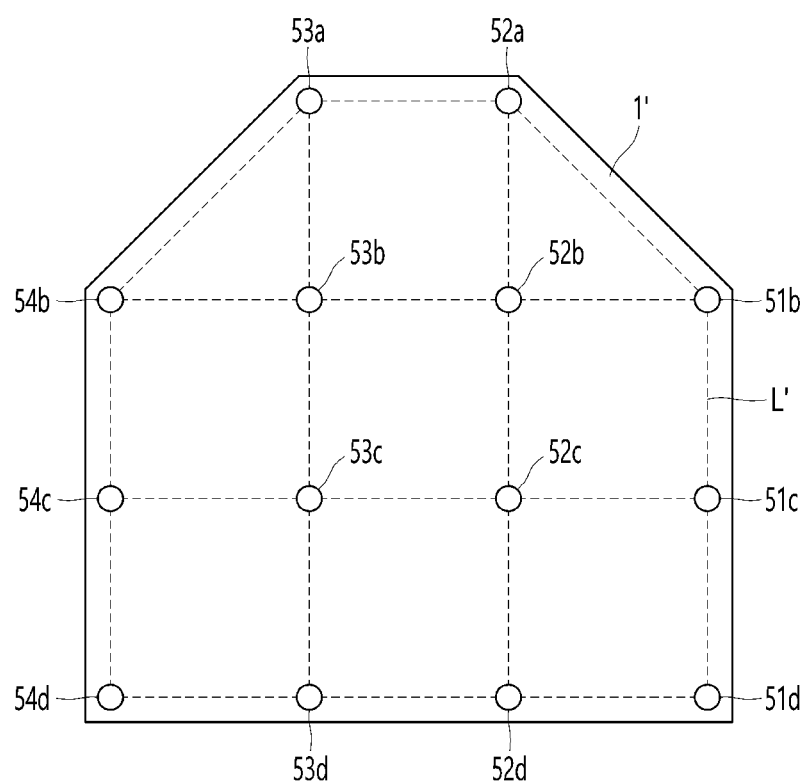
FIG. 12 is a front view showing the cutting lines of the cutting sections having an arch-shaped top surface so as to lower the possibility of collapse of a tunnel.

If necessary, as shown in FIG. 12, top cutting lines L' of the cutting sections with respect to a target surface 1' have a shape of a polygonal arch. Like this, if the top of the cutting sections has the shape of the polygonal arch, load is distributed to prevent the tunnel from collapsing during work.

Figure 13:
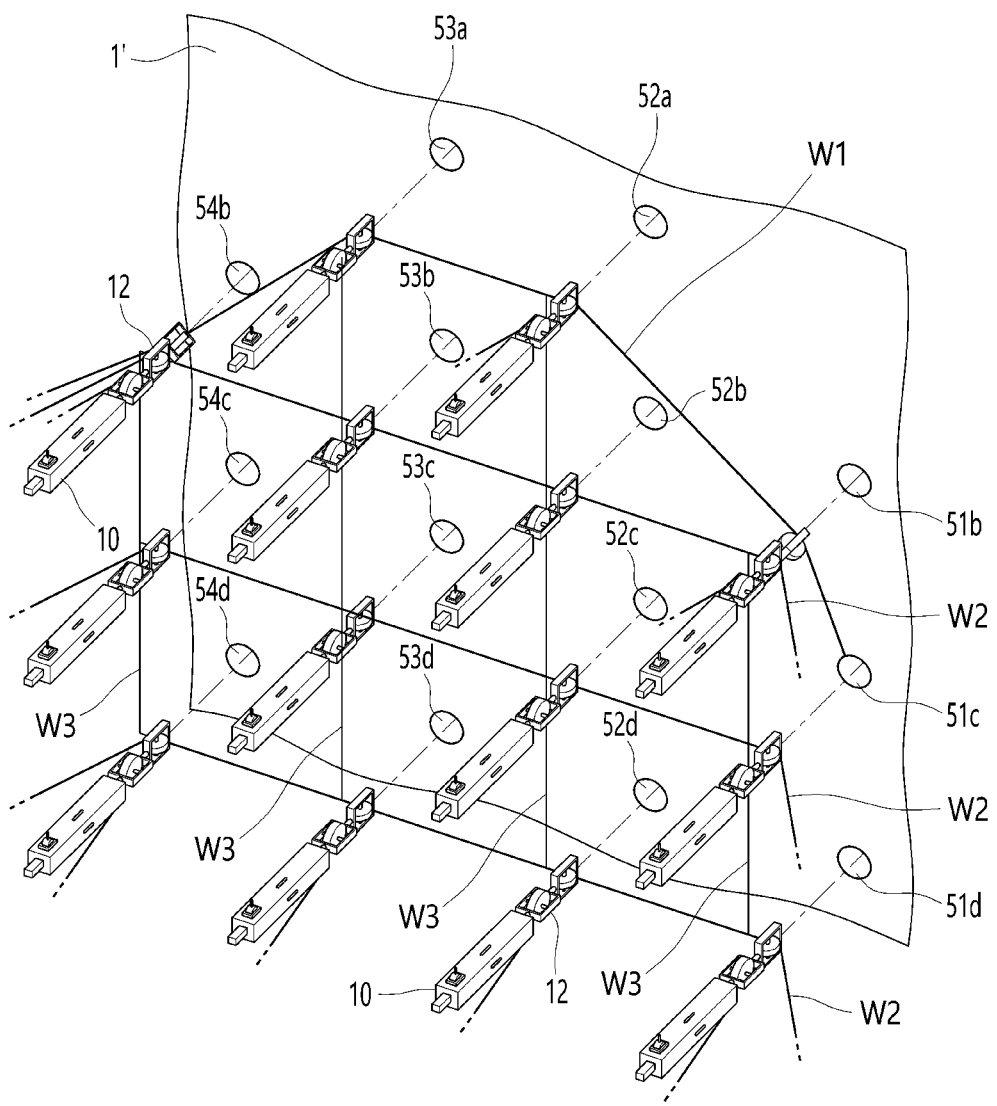
FIG. 13 is a schematic perspective view showing the entry arms and the wire saws of the wire saw excavation apparatus according to the present invention so that the wire saws cut the cutting sections all at once through the entry arms each having a plurality of pulleys, the driving roller and the support frame being omitted for the brevity of the description.

FIG. 13 is a schematic perspective view showing the entry arms and the wire saws of the wire saw excavation apparatus so that the wire saws cut the cutting section all at once through the entry arms having the plurality of pulleys, and for the brevity of the description, the driving roller and the support frame are omitted in the figure.

First, the drilling step S10 is performed. The plurality of entry holes 51b~51d, 52a~52d, 53a~53d, and 54b~54d is drilled at a target surface 1'.

Then, the inserting step S20 of inserting a plurality of entry arms 10 into the plurality of entry holes 51b~51d, 52a~52d, 53a~53d, and 54b~54d.

In the inserting step S20, the wire saws $W_1$, $W_2$, and $W_3$ should be wired onto the entry arms 10 and the driving roller before the entry arms are inserted into the plurality of entry holes 51b~51d, 52a~52d, 53a~53d, and 54b~54d. All wire saws may be wired to the same drive roller, but are not limited thereto. That is, it is also possible for the wire saw excavation apparatus to have a plurality of driving rollers driven independently of each other, and some of the plurality of wire saws may be wired onto different drive rollers.

On the other hand, the number of pulleys 12 installed in each entry arm 10 may vary depending on the number of wire saws inserted into the entry holes. For example, in the case of the entry arms 10 inserted into the entry holes 51b and 54b, the first wire saw W1, the second wire saw W2, and the third wire saw W3 are all wired, and accordingly, three pulleys 12 are installed. Since only two wire saws are wired onto the remaining entry holes, two pulleys 12 are installed.

If the plurality of pulleys 12 is not installed in each entry arm 10, there is a possibility that the wire saws may be broken or damaged due to friction between the crossing portions of the wire saws during excavation. However, the wire saw excavation apparatus according to the present invention can vary the number of pulleys 12 installed on the entry arms 10 according to the number of wire saws inserted into each entry hole, and accordingly, even if the plurality of wire saws is driven all at once, it is possible to prevent the intersecting portions of the wire saws from being broken due to their friction during the excavation process. That is, the wire saw excavation apparatus according to the present invention advantageously cuts the cutting lines of the cutting sections through only single excavation by varying the number of pulleys 12 installed on each entry arm 10.

Like this, after the entry arms on which the wire saws are wired have been inserted into the entry holes, the support frame is installed at the step S30, and the driving roller operates to cut the rock at the step S40.

Figure 14:
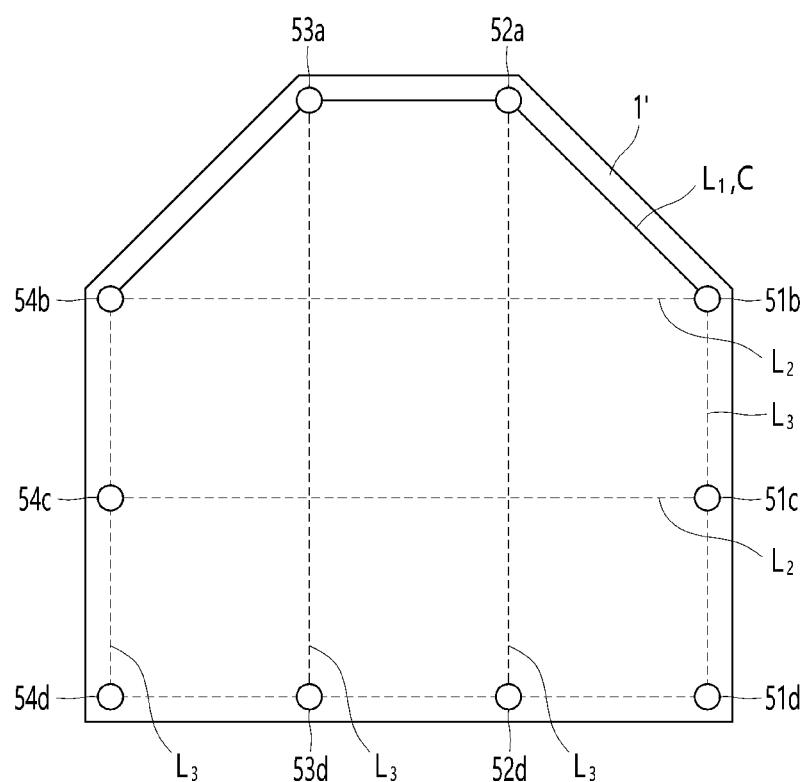
FIGS. 14 to 16 are front views showing an excavation method for drilling entry holes along only the edges of the cutting sections to more efficiently perform excavation.
Figure 15:
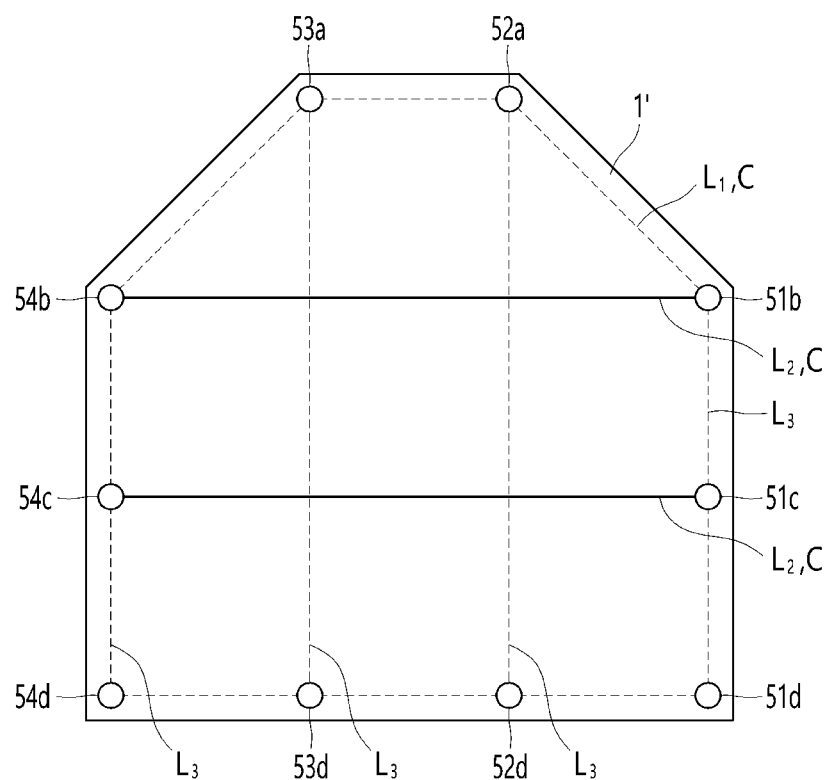
Figure 16:
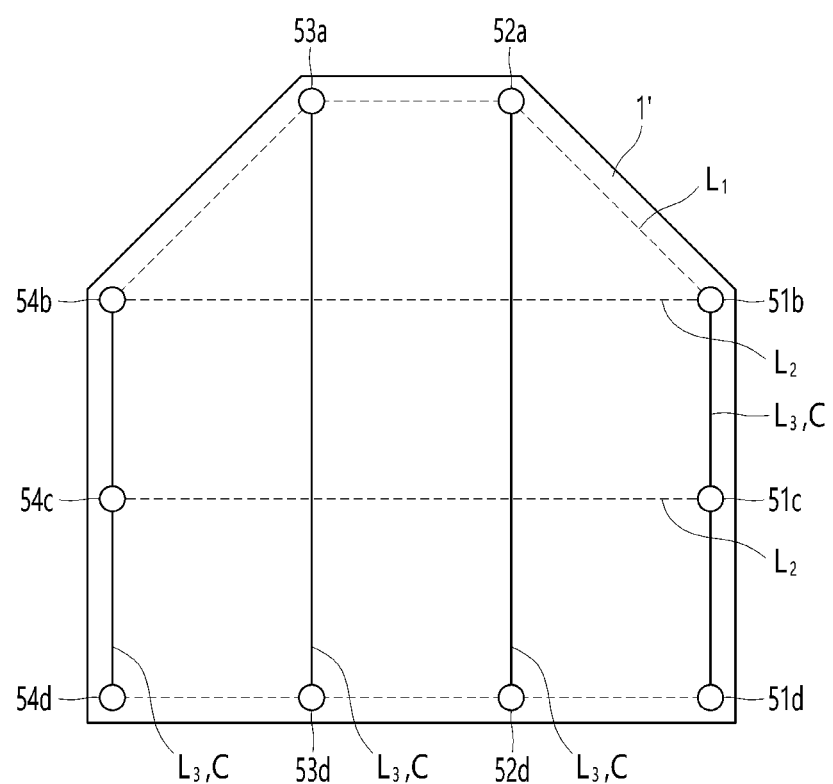

On the other hand, in the wire saw excavation method, the process of drilling the entry holes along the cutting sections also takes a lot of time. In addition, the target surface does not always have the same rock quality, and different working environments are given every time. If necessary, therefore, as shown in FIGS. 14 to 16, the entry holes can be drilled only along the edges of the cutting sections, so that the drilling can be carried out more efficiently. As such, when the entry holes are drilled only on the edges of the cutting sections, the types and positions of the entry arms and the wiring of the wire saws of the wire saw excavation apparatus may be applied only to the edges of the cutting sections as shown in FIG. 13.

On the other hand, in this case, a time interval (for example, 10 minutes) should be provided to prevent the friction between the wire saws at their intersecting portion in the inner portions of the cutting sections during the excavation process. Specifically, it is as follows.

First, as shown in FIG. 14, the first cutting line $L_1$ corresponding to the first wire saw is cut. Then, as shown in FIG. 15, after taking a time interval, the second cutting line $L_2$ corresponding to the second wire saw is cut. The time interval is not conditional on the complete cutting along the first cutting line $L_1$, but allows a given period of time so that as the wire saw through pre-cutting is inserted to a given depth, the wire saw which performs post-cutting does not have any friction with the wire saw performing the pre-cutting. For example, in 10 minutes from the cutting along the first cutting lines $L_1$, the cutting along the second cutting lines $L_2$ is performed. Lastly, as shown in FIG. 16, cutting along third cutting lines $L_3$ is performed with a time interval with the cutting along the second cutting lines $L_2$.

According to the method as shown in FIGS. 14 to 16, the cutting operations for the plurality of section surfaces is performed all at once, and it is possible to reduce working hours by reducing the unnecessary drilling works for entry holes. Through the time interval of wire saw driving during the excavation, further, the wire saws can be prevented from being broken due to their friction. In addition, even by the method shown in FIGS. 14 to 16, there is an advantage of cutting all the cutting lines of the cutting sections through only one time excavation using the wire saw excavation apparatus.

Figure 17:
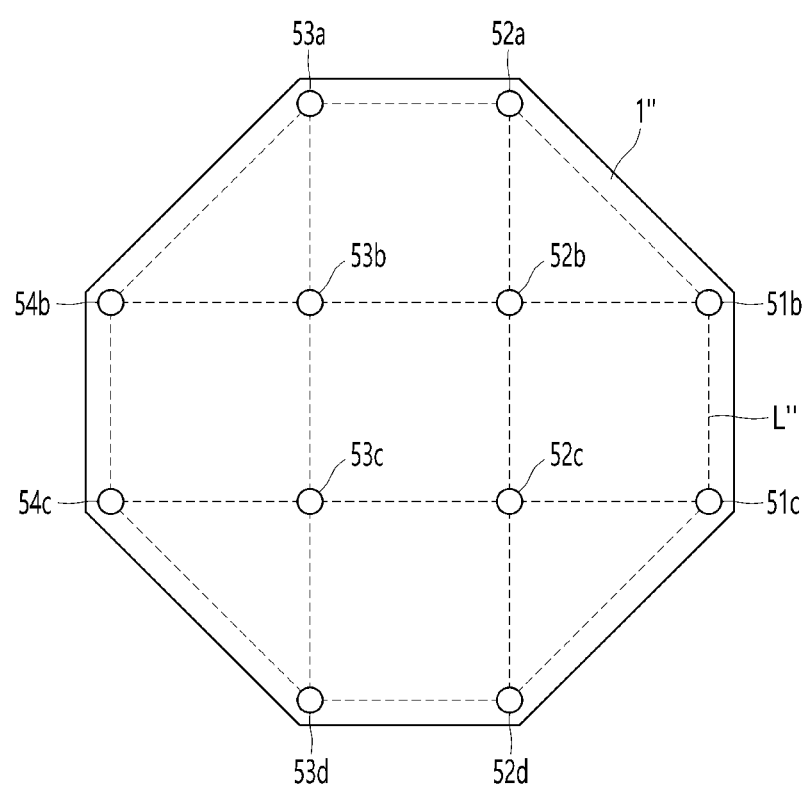
FIGS. 17 and 18 are schematic front views showing other cutting sections applied to the present invention.
Figure 18:
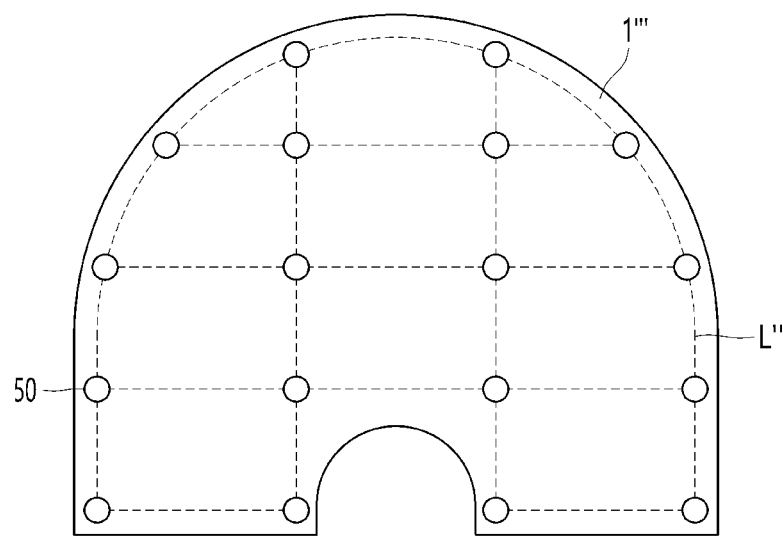

Another advantage of using the wire saw excavation apparatus according to the present invention is that it can easily treat various types of cutting sections. It is also possible to make square cutting sections (as shown in FIG. 9) or arch cutting sections (as shown in FIG. 12). In addition, it is possible to make diagonal cutting sections (as shown in FIG. 17) or rhombus cutting sections (not shown). Furthermore, the wire saw excavation apparatus according to the present invention can be applied to the arch type of cutting sections as shown in FIG. 18.

As a result, the shape consisting of a frame on the outside of the support frame may be a polygon with four or more straight sides. In addition, a portion of the support frame may be curved. For example, if the cutting sections have an arch type of top portion, the curved (e.g., semicircular) frame is simply provided to the arch type of top portion. Furthermore, it is also theoretically possible to make the outside frame of the support frame to a circular or oval shape.

Finally, the present invention has the advantage of actively responding to various working environments using the wire saw excavation apparatus.

As described above, it is possible to excavate the target surface with minimum time consumption by using the wire saw excavation apparatus according to the present invention. Further, it is possible to obtain stone in forms available in the process of excavating the tunnel.

The present invention may improve the work efficiency significantly as the wire saw excavation apparatus according to the present invention can perform the cutting operations for the plurality of the section surfaces all at once using the support frame with the matrix structure. In specific, the wire saw excavation apparatus according to the present invention can efficiently cut various types of cutting sections through the support frame and the plurality of pulleys mounted on each entry arm.

Accordingly, the tunnel excavation method using the wire saw excavation apparatus according to the present invention is efficient because it can excavate the tunnel with a minimum number of times.

On the other hand, even if the effects are not explicitly mentioned herein, the effects described in the following statement expected by the technical features according to the present invention and its potential effects would be treated as described in the statement according to the present invention.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A wire saw excavation method comprising the steps of:
drilling a plurality of entry holes on edge lines and crossing points of lattice type cutting lines on a surface of a target to be excavated and inserting a plurality of entry arms into the plurality of entry holes, each entry arm having multi-directional pulleys on which wire saws are wired to correspond to a direction of each of the multi-directional pulleys so as to segmentedly cut an entire section of the target all at once using the wire saws;
collecting the wire saws in a same direction to driving rollers corresponding to the direction, so as to rotate the multi-directional pulleys in different directions from one another to perform a cutting operation for cutting the entire section of the target; and
cutting simultaneously the entire section of the target in multiple directions using tensions of the wire saws by operating the driving rollers simultaneously with a support force generated from a support frame supporting the plurality of the entry arms, thereby segmentedly cutting the edge lines and the lattice type cutting lines of the target all at once.

2. A wire saw excavation apparatus for segmentedly cutting an entire section of a target to be excavated all at once, the apparatus comprising:
entry arms inserted into entry holes drilled on crossing points of cutting lines of the entire section of the target to be excavate;
multi-directional pulleys mounted on end portions of the entry arms in any one direction of horizontal, vertical, and diagonal directions respectively;
wire saws wired onto the multi-directional pulleys and passing through the entry holes and a section of the target to be excavated,
driving rollers to which the wire saws in a same direction are wired respectively,
wherein the wire saws in one direction connect each multi-directional pulley of the direction mounted on adjacent entry arms,
wherein the multi-directional pulleys rotate in different directions from one another as all of the driving rollers operate simultaneously, the wire saws simultaneously cut edge lines of the entire section and lattice type cutting lines inside the entire section in multiple directions all at once.

\* \* \* \* \*